United States Patent [19]

Schalles

[11] Patent Number: 5,787,560
[45] Date of Patent: Aug. 4, 1998

[54] NUMERICALLY CONTROLLED LATHE

[75] Inventor: Erhard Schalles, Bielefeld, Germany

[73] Assignee: Gildemeister AG, Bielefeld, Germany

[21] Appl. No.: 750,586

[22] PCT Filed: Mar. 1, 1996

[86] PCT No.: PCT/EP96/00877

§ 371 Date: Dec. 6, 1996

§ 102(e) Date: Dec. 6, 1996

[87] PCT Pub. No.: WO96/32224

PCT Pub. Date: Oct. 17, 1996

[30] Foreign Application Priority Data

Apr. 13, 1995 [DE] Germany ............... 195 13 963.1

[51] Int. Cl.⁶ ............... B23R 23/00; B23B 29/24
[52] U.S. Cl. ............... 29/36; 29/27 C; 82/129; 82/159
[58] Field of Search ............... 29/36, 39, 40, 29/41, 50, 42, 51, 53, 54, 55, 27 C, 27 R; 82/129, 159

[56] References Cited

U.S. PATENT DOCUMENTS

| | | | |
|---|---|---|---|
| 3,990,133 | 11/1976 | Schalles | 29/27 C |
| 4,452,109 | 6/1984 | Ballach et al. | 82/131 X |
| 4,457,193 | 7/1984 | Matthey | 29/36 X |
| 4,612,832 | 9/1986 | Ushigoe et al. | 82/129 |
| 5,163,009 | 11/1992 | Yamale | 82/129 |
| 5,210,917 | 5/1993 | Piguet et al. | 29/36 |

FOREIGN PATENT DOCUMENTS

| | | |
|---|---|---|
| 0 410 044 | 11/1989 | European Pat. Off. |
| 2 563 454 | 4/1985 | France. |
| 35 18 792 | 11/1986 | Germany. |
| 36 26 324 | 2/1988 | Germany. |
| 40 28 030 | 5/1992 | Germany. |
| A1183301 | 7/1989 | Japan. |
| A6000703 | 1/1994 | Japan. |
| WO 91/14534 | 10/1991 | WIPO. |

*Primary Examiner*—William R. Briggs
*Attorney, Agent, or Firm*—Pollock, Vande Sande & Priddy

[57] ABSTRACT

A numerically controlled lathe with a stationary headstock and a work spindle, mounted rotatably in the headstock, for holding a work in a first clamping includes a counter spindle for holding rotatably the workpiece in a second clamping. The lathe also has a tool turret, which can be indexed around an axis and which is mounted on a first slide, movable in two directions that are perpendicular to each other. This first slide also supports the counter spindle. A second tool holder is mounted next to the work spindle. The counter spindle and the tool turret are mounted on the first slide in mutually variable configuration; and the second tool holder is mounted on a second slide, which can be moved at least in a direction perpendicular to the work spindle axis. This second tool holder holds two groups of tools, one of which is mounted and designed for machining the work at the work spindle and the other is mounted and designed for machining the work at the counter spindle.

11 Claims, 1 Drawing Sheet

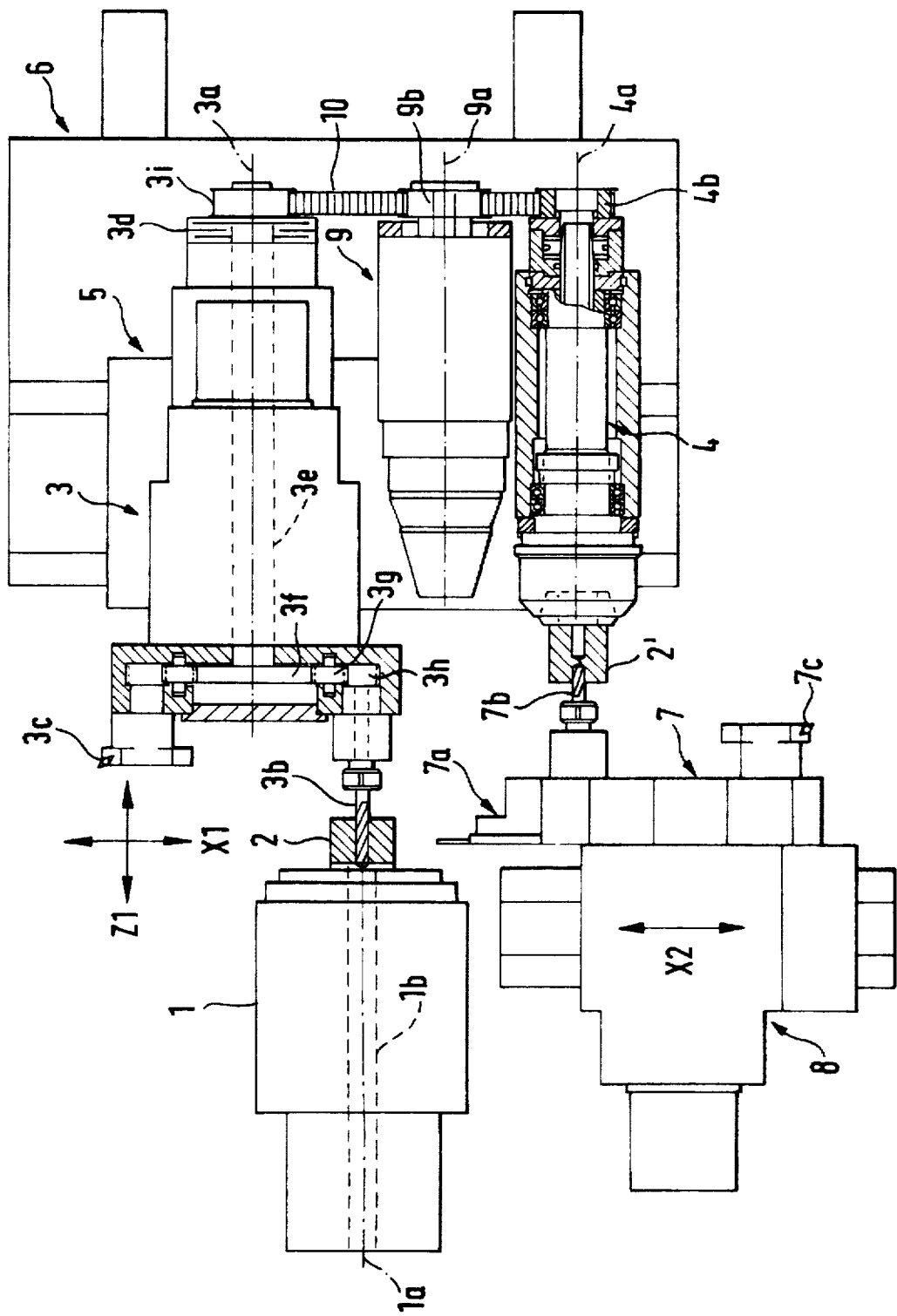

NUMERICALLY CONTROLLED LATHE

TECHNICAL FIELD

The invention relates to a numerically controlled lathe according to the preamble of claim 1.

BACKGROUND ART

In the case of a known lathe of this kind (JP-A 1-183301) the counter spindle can be moved in the X direction by means of a hydraulic drive. This moveability of the counter spindle in the X direction by means of a special drive is necessary, since in the known solution a cutting off operation can be performed only with a cutting off tool, which sits on the tool turret, which sits on the same slide as the counter spindle. The positioning of the counter spindle by means of the hydraulic drive results in a decrease in accuracy. The existing second tool holder is mounted stationarily. With the known machine simultaneous machining at main and counter spindle is not possible.

Furthermore, there exists a lathe (JA-A 6-703), which exhibits a counter spindle, mounted on a compound slide rest, and two indexing tool holders, which can be moved in the X direction. One of the tool holders exhibits two groups of tools, one of which is designed for machining works at the main spindle and the other for machining works at the counter spindle. With this machine a simultaneous machining of works at the main and counter spindle is possible, but there must exist two cross slide rests, which can be moved in the X direction, for the tools and a compound slide rest for the counter spindle. Therefore, the machine is comparatively complicated.

THE INVENTION

Starting from the aforementioned prior art, the invention is based on the problem of designing such a lathe in such a manner that it can machine the works at the work spindle and counter spindle, while simultaneously keeping the number of axes of this machine at a minimum.

The solution to this problem is disclosed with the features of the characterizing part of claim 1.

The machine, according to the invention, permits simultaneous machining despite its comparatively simple construction. Moreover, owing to its construction the accuracy of this machine is higher than for a lathe, whose counter spindle can be moved with respect to the tool turret. In the solution according to the invention the mounting of the counter spindle is significantly more reinforced.

Preferred embodiments of the invention are described in the dependent claims.

In a first preferred embodiment the lathe is designed for simultaneous machining of the works, clamped at the work spindle and the counter spindle, with tools, whose spatial relationship to each other remains unchanged during the machining operation in the X direction or in the Z direction. Such a rigid arrangement during the machining operation leads to high machining speeds with high machining accuracy.

In this respect it has been proven to be expedient for the second slide with the second tool holder to be moveable also in the direction of the work spindle axis and for the numerical controller to process the traverse information of the first slide, supporting the counter spindle, in such a manner with the traverse commands for the second slide that while the tools of the tool turret are machining the work, clamped into the work spindle, the tools of the second slide, which machine the work clamped into the counter spindle, can follow.

Generally the slide traversing paths are computed starting from a fixed reference point on the machine. The reference point for the counter spindle is variable as a function of the movement of the first slide, so that the feed distances of the second slide have to be computed and controlled from the momentary position of the reference point, the compensation position.

Other preferred embodiments of the invention follow from the other dependent claims.

BRIEF DESCRIPTION OF THE FIGURES

A preferred embodiment of the invention is described below in detail with the aid of the drawing. The drawing is a diagrammatic top view of an embodiment with a sectional view of some components.

BEST METHOD FOR IMPLEMENTING THE INVENTION

In a stationary headstock 1 is mounted a work spindle 1b, which holds a work 2 in a first clamping and which rotates around a work spindle axis.

In the operating condition shown in the drawing a longitudinal channel is drilled by means of a drill 3b into the work 2 starting from the front side. The drill 3b is mounted on the front side of a tool turret, all of which is designated with the number 3. The tool turret 3 is penetrated in the longitudinal direction by a drive shaft 3e. The drive shaft 3e is driven from the rear. The rotary motion of the drive shaft 3e is transferred by means of a spur gear 3f and an intermediate gear 3g to a gear wheel 3h, which is connected stationarily to the chuck for the drill 3b.

The drive shaft 3e can be connected rotatingly to the rear of the tool turret 3 by means of an engagable clutch 3d or be separated from said tool turret.

The tool turret 3 sits on an X slide 5, which in turn sits on a Z slide 6. A counter spindle 4 is mounted on the X slide 5 so as to be axially parallel. The axis of rotation 4a of the counter spindle 4 runs parallel to the indexing axis 3a of the tool turret 3.

A drive motor 9 is also mounted parallel to the axis of rotation 9a between the tool turret 3 and the counter spindle 4. The tool turret 3, the drive motor 9 and the counter spindle 4 or its respective housing are mounted stationarily on the X slide. The drive motor 9 has a drive wheel 9b, whose rotary motion is transferred by means of a drive belt 10 to not only the drive wheel 3i of the tool turret 3 but also to a drive wheel 4b of the counter spindle.

A work 2', whose front side has already been drilled in the first clamping in the work spindle 1b, is clamped into the counter spindle 4. Another borehole is drilled into the rear of the work 2' by means of a drill 7b. The drill 7b sits on the front side of a tool holder 7, designed as a turret disk. Another lathe tool, namely a cutting tool 7c—also for machining the work 2'—, also sits on the front side. As in the case of the tools, illustrated at the tool holder 7, the tools, illustrated at the tool turret 3, as well as the cutting tool 3c and the drill 3b are shown merely as examples.

A cut-off tool 7a is mounted on the circumference of the tool holder 7, which is designed as a turret disk. This tool can be moved adjustably on the circumference of the turret disk in the Z direction.

The tool holder 7 is located on a cross slide rest 8, which can be moved in the X2 direction.

In a modified version of the illustrated machine, the cross slide rest 8 can sit on a longitudinal slide, so that the tool holder 7 is mounted on a compound slide rest.

I claim:

1. A numerically controlled lathe comprising, a stationary headstock and a work spindle, mounted rotatably about an axis in the headstock for holding a workpiece comprising:

a first clamping means;

second clamping means comprising a counter spindle for rotatably holding the workpiece about an axis;

a tool turret which can be indexed around an axis;

a first slide for supporting the counter spindle and the tool turret and movable in two directions that are perpendicular to each other; and a second tool holder mounted next to the work spindle;

wherein the counter spindle and the tool turret are separately mounted on the first slide in a mutually invariable configuration with respect to each other; and the second tool holder is mounted on a second slide, movable at least in a direction perpendicular to the work spindle axis and supporting two groups of tools, one of which is mounted and designed for machining the workpiece at the work spindle and the other is mounted and designed for machining the workpiece at the counter spindle.

2. A lathe as claimed in claim 1 including a numerical control means to provide that the second slide, supporting the second tool holder or its tool, which machines a workpiece clamped into the counter spindle, compensates totally and without drag error for the movement of the first slide for machining the workpiece clamped into the work spindle; and wherein the machining feed distance of the second slide is traversed starting from a variable compensating position.

3. A lathe as claimed in claim 2, wherein the second slide with the second tool holder is movable in the direction of the work spindle axis; and the numerical controller processes the traverse information of the first slide, supporting the counter spindle in such a manner with the traverse commands for the second slide that while the tools of the tool turret are machining the workpiece clamped into the work spindle, the tools of the second slide, which machine the workpiece clamped into the counter spindle, can follow.

4. A lathe as claimed in claim 1, wherein the tool turret exhibits rotatingly driven tools, and wherein the counter spindle and the tools are driven by a common motor.

5. A lathe as claimed in claim 4, wherein the rotor of the motor is stationarily connected to the counter spindle and the stator is stationary in the housing.

6. A lathe as claimed in claim 4 including clutch means whereby the drive of the rotating tools can be switched on and off by means of said clutch.

7. A lathe as claimed in claim 1, wherein the axis of an indexable tool turret and the axis of the counter spindle are parallel to each other and to the work spindle axis.

8. A lathe as claimed in claim 4, wherein the axis of the indexable tool turret, the axis of the counter spindle, and the axis of the motor are parallel to each other and to the work spindle axis.

9. A lathe, as claimed in claim 1, wherein the tools of the second tool holder provided for machining the workpiece held by the work spindle are mounted on the outer circumference of a turret disk and are attached adjustably in the direction of the indexing axis of the turret disk.

10. A lathe, as claimed in claim 9, wherein at least one of said groups of tools, provided or machining the work held by the counter spindle, are mounted on a face of the turret disk.

11. A lathe, as claimed in claim 9, wherein at least one of said groups of tools, provided or machining the work held by the counter spindle, are mounted on the outer circumference of the turret disk.

* * * * *